United States Patent
Peterson

[15] 3,678,359
[45] July 18, 1972

[54] DIRECT CURRENT MOTOR HAVING IMPROVED COMMUTATION MEANS

[72] Inventor: Donovan F. Peterson, 655 Meadow Lane, Elm Grove, Wis. 53122

[22] Filed: Dec. 21, 1970

[21] Appl. No.: 100,061

[52] U.S. Cl..............................................318/254, 310/46
[51] Int. Cl. .......................................................H02k 29/02
[58] Field of Search ...............318/259, 138; 310/40, 46, 156

[56] References Cited

UNITED STATES PATENTS

| | | |
|---|---|---|
| 2,558,540 | 6/1951 | Clos..........................................310/46 |
| 3,185,910 | 5/1965 | Knapp...............................318/254 X |
| 3,546,507 | 12/1970 | Wengel.................................310/46 X |
| 3,297,891 | 1/1967 | Foran, Jr. ..................................310/46 |
| 3,435,313 | 3/1969 | Siefert et al............................318/138 |
| 3,096,467 | 7/1963 | Angus et al..............................318/138 |

Primary Examiner—D. F. Duggan
Attorney—Andrus, Sceales, Starke & Sawall

[57] ABSTRACT

A direct current motor of the type having a bar magnet rotor utilizes magnetic reed switches as a commutation means. The reed switches are operable by the bar magnet rotor to effect commutation of the motor.

5 Claims, 6 Drawing Figures

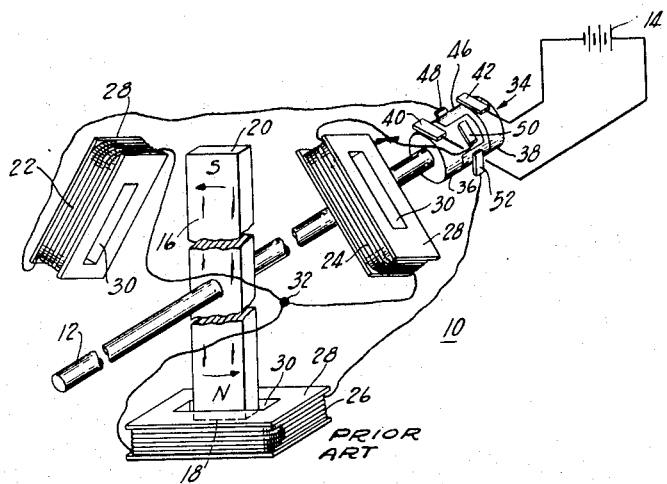

PRIOR ART

PATENTED JUL 18 1972

INVENTOR.
DONOVAN F. PETERSON
BY
Daniel D. Fetterley
ATTORNEY

DIRECT CURRENT MOTOR HAVING IMPROVED COMMUTATION MEANS

BACKGROUND OF THE INVENTION

1. Field of the Invention

The present invention relates to electric motors, and more specifically to a direct current motor having an improved commutation means.

2. Description of the Prior Art

Direct current motors produce torque through the interaction of current carrying conductors and a magnetic field. The current carrying conductors or the magnetic field must be relatively rotatable with respect to the other. In a typical direct current motor, a plurality of current carrying conductors are incorporated in a rotatable armature member and the magnetic field is produced by stationary field windings and pole pieces. However, direct current motors may also be constructed with stationary current carrying conductors and a rotatable magnetic member, such as a permanent magnet rotor or a slipring energized electromagnet. The invention described herein has presently been found more suitable for incorporation in the latter type of direct current motor.

In either type of direct current motor, the motor requires a switching means which sequentially supplies direct current energization to the current carrying conductors as the rotary member of the motor revolves, thereby to maintain the essential torque producing relationships in the motor. Such a switching means is termed a commutator.

In the past, commutators have been constructed of a number of metal bar or plate segments which are positioned on a drum and mounted coaxially with the rotating member of the motor. The segments of the commutator are insulated from each other as by mica or other insulating material. Two or more brushes, typically carbon blocks or metal leaf springs, bear on the drum so as to provide the desired switching action as the drum is rotated.

While commutators incorporating such a construction have proven workable, they suffer numerous shortcomings. Since there is movement between the commutator segments and brushes, there is inevitably wear on one or both of the commutator elements, resulting in oxidation, dirt, sparking, vibration, misalignment etc. in the commutator. These phenomena lessen the electrical and mechanical efficiency and reliability of the commutator in many ways and necessitate the eventual replacement of the elements of the commutator.

SUMMARY OF THE PRESENT INVENTION

It is, therefore, the object of the present invention to provide a direct current motor having an improved commutation means.

It is a further object of the present invention to provide such a motor in which the commutation means is capable of effecting the switching operation with essentially no wear and which therefore has extremely long, if not unlimited, service life.

It is a more specific object of the present invention to provide an improved commutation means for a direct current motor in which there appears a rotating magnetic field.

In a typical embodiment of the present invention, the motor includes stationary windings of conductors which are selectively switched by the commutator so that the current carrying ones of the conductors are maintained in the correct torque producing relationship with a rotating bar magnet producing the rotating magnetic field.

The essence of the present invention lies in the use of magnetic reed switches, or the like, to effect the switching action of the commutator responsive to the magnetic field of the rotating bar magnet. The switches are interposed between the conductor windings and a source of direct current such as a battery. The reed switches are biased, as by a permanent magnet, to a normally open position and so as to be operable to the closed position by a preselected pole of the bar magnet. The switches are positioned in the motor adjacent the ends of the bar magnet so as to be closable in a desired sequence as the bar magnet and motor output shaft rotate, thereby to commutate the conductor coils.

BRIEF DESCRIPTION OF THE DRAWING

FIG. 1 is an exploded view of a prior art direct current motor and the commutator incorporated therein.

FIG. 2 is an exploded view of a motor constructed in accordance with the present invention and incorporating an improved commutation means.

FIG. 3 is a cross sectional, schematic diagram of magnetic reed switches and the means for biasing them which may be incorporated in the improved commutation means shown in FIG. 2.

FIG. 4 is a schematic diagram of the direct current motor of FIG. 2 showing the electrical connection of the commutation means in the motor and to a source of direct current.

FIG. 5 is a schematic diagram showing a modification of the direct current motor of the present invention.

FIG. 6 is an exploded view showing another modification of the direct current motor of the present invention in which the commutation means has been altered.

DESCRIPTION OF THE PREFERRED EMBODIMENT

Direct current motor 10 includes an output shaft 12 which is rotated by the torque producing current-magnetic field relationship established in motor 10 when energized from battery 14. A rotor 16 consisting of a bi-polar bar magnet having a north pole 18 and a south pole 20, is mounted on shaft 12 so that the axis of the poles is perpendicular to the axis of rotation of shaft 12. The poles 18 and 20 move in a circular path as shaft 12 rotates and the axis of poles generates a plane perpendicular to shaft 12.

The stator of motor 10 comprises three bobbin wound windings 22, 24 and 26. Each of the windings is wound on a spool 28 of generally rectangular construction and having a rectangular opening 30 in the center. The wire forming the stator windings is wound around the spool in reel-like fashion and the two ends of the coil-forming wire are extracted for connection purposes hereinafter described.

The three windings are arranged on the frame of the motor (not shown) in essentially a closed equilateral triangular configuration, with each winding occupying one side of the configuration. The plane of the triangular configuration lies perpendicular to the axis of rotation of shaft 12 but is coplanar with the plane of rotation of the polar axis of rotor 16. When the motor is assembled, the poles of rotor 16 are periodically inserted in rectangular openings 30 of spools 28 as rotor 16 rotates.

Stator windings 22, 24, and 26 are electrically connected in the following manner. One end of each of the windings is connected to a common junction 32. The other end of each of the windings is connected to a commutation means to selectively provide electrical energization to the windings in accordance in a predetermined switching sequence.

FIG. 1 shows a prior art commutation means used with direct current motor 10. The commutation means consists of a drum 34 mounted on shaft 12 so that the axis of the drum is coaxial with the axis of rotation of shaft 12. A pattern of electrically conductive and non conductive areas is placed on drum 34 to control the energization of windings 22, 24 and 26 as rotor 16 rotates. A positive bus 36 lies along one edge of the surface of drum 34 while a negative bus 38 lies along the other edge of the surface. Brush 40, connected to the positive terminal of battery 14, contacts positive bus 36 while brush 42, connected to the negative terminal of battery 14, contacts negative bus 38. Brushes 40 and 42 remain in contact with buses 36 and 38 for all rotary positions of commutator drum 34 and rotor 16.

A rectangular positive commutator segment 44 extends from positive bus 36 for a portion of the length of the latter. A similarly shaped negative commutator segment (not shown) extends from negative bus 38 for a portion of the length of the negative bus. The commutator segments are separated by a non conductive insulating area 46 which lies between the segments and the buses.

The commutator brushes, connected to one end of each of windings 22, 24, and 26, are positioned so as to contact the positive and negative commutator segments as commutator drum 34 rotates. Specifically, commutator brush 48 is connected to one end of winding 22, commutator brush 50 is connected to one end of winding 24 and commutator brush 52 is connected to one end of winding 26. Commutator brushes 48, 50 and 52 serve to selectively energize stator windings 22, 24 and 26 as commutator drum 34 rotates.

In operation, with rotor 16 positioned as shown in FIG. 1, i.e., with north pole 18 inserted in opening 30 of winding 26, commutator drum 34 is positioned so that brush 50 is in contact with positive commutator segment 44 to connect one end of winding 24 to the positive terminal battery 14. Brush 48 is in contact with the negative segment of commutator drum 34 to connect winding 22 to the negative terminal of battery 14. Winding 26 is deenergized. The electrical circuit is completed by common junction 32 so that conventional current flows from the positive terminal of battery 14 through winding 24, common junction 32, and winding 22 to the negative terminal of battery 14. The current carrying conductors of windings 24 and 22 exert a torque on south pole 20 of rotor 16 causing the rotor to rotate. The direction of rotation of rotor 16 depends on the winding direction of the windings and may be assumed to be in the counter clockwise direction as shown in FIG. 1 by the arrows.

As rotor 16 rotates, commutator drum 34 is also rotated to effect a selective connection of windings 22, 24 and 26 to battery 14 in a manner to continue the rotation of rotor 16. For example, when rotor 16 has rotated 60 degrees counter clockwise, commutator drum 34 has shifted to a position in which brush 48 has been moved off of the negative segment to deenergize winding 22. Brush 52 has been moved onto the negative segment to connect winding 26 to the negative terminal of battery 14. Brush 50 remains in contact with positive commutator segment 44. Conventional current now flows from the positive terminal of battery 14 through winding 24, common junction 32, and winding 26 back to the negative terminal of battery 14. The current carrying conductors of windings 24 and 26 exert a torque on the north pole 18 of rotor 16 which continues the rotation of rotor 16.

The above operation of motor 10 continues with commutation occurring each 60° of rotation of rotor 16 or 6 times per revolution of rotor 16. A motor having the above described structure and mode of operation is made and sold by the Hankscraft Company of Reedsburg, Wisconsin as a Series 3000 display motor.

In the improved motor 10A of the present invention, the drum commutator is replaced with magnetic reed switches operable by the magnetic field of bar magnet rotor 16. The mechanical and electro mechanical features of the magnetic reed switch commutation means are shown in FIGS. 2 and 3. The electrical connection of the reed switches is shown schematically in FIG. 4.

Referring to FIG. 3, the details of a magnetic reed switch 60 suitable for use in motor 10A are shown diagrammatically. Each reed switch 60 includes an impervious vial or container 62 for containing the switch elements. Vial 62 is typically glass but may be other materials, such as metal. Magnetic reed switches are typically single pole, double throw switches in which the movable member or reed of the switch is normally biased into one of the two throw positions. In FIG. 3, movable leaf reed 64 is shiftable between reed 66 and reed 68 when a magnetic field is applied to the switch. The movable reed may be constructed of soft iron or other magnetically responsive material for the purpose. Movable reed 64 is normally biased against reed 66 and away from reed 68, as by spring 70. Reeds 64, 66 and 68 are connected to leads 72, 74 and 76 for interposing the switch in the current carrying path to be made or broken. Each of the magnetic reed switches incorporated in direct current motor 10A of the present invention may be of the type described and may, more specifically, be the magnetic reed switches manufactured and sold by the Hamlin Mfg. Co. of Lake Mills, Wisconsin as "C" Contact. type switches.

When incorporated in motor 10A, each of magnetic reed switches 60 has associated therewith a magnet which moves movable reed 64 out of the biased position, in which it is in contact with reed 66, and into contact with reed 68. For example, magnets 78 or 79 may be placed on vial 62 so as to move movable reed 64 into contact with reed 68 and retain it there. When movable reed 64 is in contact with reed 66, magnetic reed switch 60 is hereinafter termed "closed" or in the "closed position" or "first position." When movable reed 64 is in contact with reed 68, magnetic reed switch 60 is hereinafter termed "open" or in the "second position."

In order to provide the necessary switching or commutation function in motor 10A, six magnetic reed switches 601 through 606 are utilized in the commutation means, as shown in FIGS. 2 and 4. These magnetic reed switches are grouped in pairs, a typical pair being shown in FIG. 3. In each pair of reed switches, there is one reed switch which is biased by a bar magnet 78 having a North pole-South pole orientation and one reed switch which is biased by a magnet 79 having a South pole-North pole orientation. If necessary or desirable, the reed switches 60 may be separated by a non magnetic divider, such as a piece of aluminum, and the two reed switches, magnets, and the spacer bound into an integral unit as by a shrinkable tetrafluroethylene sleeve (not shown).

The pairs of reed switches are selectively operated by the bar magnet of rotor 16 as the rotor rotates to effect commutation of windings 22, 24 and 26. For this purpose, it has been found convenient to mount the pairs of magnetic reed switches on the exterior of spools 28, as shown in FIG. 2. The switches are operated as the poles of rotor 16 are periodically inserted in rectangular openings 30 of spools 28. Due to the bias provided by bar magnets 78 and 79, the operation of the magnetic reed switches of each pair is one of mutual exclusivity. That is, north pole 18 of rotor 16 operates the one of the pair of magnetic reed switches biased by the South pole-North pole bar magnet 79 by overcoming the magnetic bias of the bar magnet. The other of the pair of magnetic reed switches, that is, the one biased by the North pole-South pole bar magnet 78, is retained in the biased position, as north pole 18 or rotor 16 reinforces the bias supplied by bar magnet 78. When the south pole of rotor 16 is inserted in rectangular opening 30 of a given spool 28, the operation of the magnetic reed switches is the opposite.

For each pair of magnetic reed switches, leads 72 are connected in parallel to an end of a stator winding, as shown in detail in FIG. 2 in connection with magnetic reed switches 602 and 605. Lead 74 of one of the magnetic reed switches, for example, reed switch 605 is connected to the positive terminal of battery 14, while the lead 74 of the other magnetic reed switch, for example, magnetic reed switch 602 is connected to the negative terminal of battery 14. Lead 76 of each of the magnetic reed switches is not used.

The connection of the other magnetic reed switch pairs, reed switches 601 and 604, and reed switches 603 and 606, to battery 14 is not shown in FIG. 2 for clarity, but is analogous to the connection of reed switches 602 and 605. The connection of all magnetic reed switches is, however, shown in schematic form in FIG. 4. Paired reed switches 602 and 605 connect winding 26 to the negative and positive terminals of battery 14, respectively; paired reed switches 601 and 604 connect winding 24 to the positive and negative terminals of battery 14, respectively; and paired reed switches 606 and 603 connect winding 22 to the negative and positive terminals of battery 14, respectively. Magnetic reed switches 602, 604 and 606, which connect the negative terminal of battery 14 to windings 26, 24, and 22 respectively, are all biased with the South pole-North pole bar magnets 79 whereas magnetic reed switches 605, 601 and 603, which connect the positive terminal of battery 14 to windings 26, 24 and 22 respectively, are all biased with the North pole-South pole bar magnets 78.

The operation of motor 10A is as follows. It may be assumed that rotor 16 is rotating in the counter clockwise direction and is instantaneously positioned as shown in FIG. 4. In this position, north pole 18 of rotor 16 is inserted in rectangular opening 30 of coil 26. The magnetic field created by north pole 18 causes magnetic reed switch 606 to close by overcoming the bias placed thereon by bar magnet 79. Closure of magnetic reed switch 606 connects one end of winding 22 to the negative terminal of battery 14, as shown by the negative sign adjacent lead 74 of magnetic reed switch 606.

It may be assumed that the previous operation of motor 10A has left magnetic reed switch 601 closed, connecting one end of winding 24 to the positive terminal of battery 14, as shown by the positive sign adjacent lead 74 of magnetic reed switch 601. Conventional current thus flows from the positive terminal of battery 14 through winding 24, common junction 32, winding 22, back to the negative terminal of battery 14. Winding 24 is deenergized. The current carrying conductors in the upper ends of windings 22 and 24 exert a torque on the adjacent south pole 20 of rotor 16 causing rotor 16 to rotate in the counter clockwise direction.

When rotor 16 has rotated 60° counter clockwise, south pole 20 of rotor 16 is inserted in rectangular opening 30 of winding 22. The south pole 20 continues to maintain magnetic reed switch 601 closed, by overcoming the bias placed on the magnetic reed switch by bar magnet 78. This maintains the connection of the positive terminal of battery 14 to winding 24. The 60° rotation of north pole 18 of rotor 20 opens magnetic reed switch 606 deenergizing winding 22. The 60° rotation of north pole 18 of rotor 20 also closes magnetic reed switch 602 which, similar to magnetic reed switch 606, is biased by bar magnet 78. Lead 74 of magnetic reed switch 602 is also connected to the negative terminal of battery 14 so that closure of magnetic reed switch 602 causes winding 26 to be connected to the negative terminal of battery 14. Conventional current now flows from the positive terminal of battery 14 through winding 24, common junction 32, and winding 26 back to the negative terminal of battery 14. The current carrying conductors of windings 24 and 26 exert a torque on the north pole 18 of rotor 16 which continues the rotation of rotor 16.

The above described operation of motor 10A continues with commutation occurring each 60° of rotation of rotor 16 or six times per revolution of rotor 16. The switching sequence is shown in tabular form below.

| Rotor Position (defined by pole insertion in specified winding) | Condition of Stator (switches in closed position) | | |
|---|---|---|---|
| | Winding 22 | Winding 24 | Winding 26 |
| N pole - winding 26 | 606 | 601 | deen. |
| S pole - winding 22 | deen. | 601 | 602 |
| N pole - winding 24 | 603 | deen. | 602 |
| S pole - winding 26 | 603 | 604 | deen. |
| N pole - winding 22 | deen. | 604 | 605 |
| S pole - winding 24 | 606 | deen. | 605 |

The direction of motor rotation may be reversed by reversing the connection of battery 14 to motor 10A.

In some applications it may be desirable to pass more current through windings 22, 24 and 26 than can be safely handled by magnetic reed switches of the general type shown in detail in FIG. 3, or to reduce the current through the magnetic reed switches. In such cases, the magnetic reed switch pairs may be utilized to drive the pair of complementary transistors, as shown in FIG. 5. FIG. 5 shows magnetic reed switches 601 and 604 connected in parallel between battery 14 and the base terminals of a complementary pair of transistors 6011 and 6041. Transistor 6011 may be of the NPN type while transistor 6041 may be of the PNP type. The collector of transistor 6011 is connected to the positive terminal of battery 14. The emitter of transistor 6011 is connected in series with the emitter of transistor 6041, the collector of which is connected to the negative terminal of battery 14. The common junction of the emitters of transistors 6011 and 6041 is connected to winding 22 by conductor 90.

In operation, magnetic reed switches 601 and 604 are operated by rotor 16 in the manner described above. The current from battery 14, applied through one or the other of magnetic reed switches 601 and 604, renders one or the other of transistors 6011 and 6041 conductive to provide current from battery 14 through conductor 90 to winding 22 thus providing amplification to the operation of the magnetic reed switches. For example, the closure of magnetic reed switch 601 renders transistor 6011 conductive to connect the positive terminal of battery 14 to winding 22, via conductor 90. Similarly, the closure of magnetic reed switch 604 renders transistor 6041 conductive to connect the negative terminal of battery 14 to winding 22. Transistors 6011 and 6041 thus provide amplification to the operation of magnetic reed switches 601 and 604.

Another modification of the motor of the present invention is shown in FIG. 6 as motor 10B. A small auxiliary bar magnet rotor 116 is mounted on an extension of rotor shaft 12 in the same angular position as main bar magnet rotor 16. The pairs of magnetic reed switches 60 and bar magnets 78 and 79 are mounted on the frame of motor 10B (not shown) so as to be operable by auxiliary rotor 116. The magnetic reed switches are connected to windings 22, 23, and 26 in the same manner as described above and the operation of motor 10B is analogous to that of motor 10A. Since the torque arm of rotor 116 is smaller than the torque arm of rotor 16, motor 10B is usable in cases in which the effect of the magnetic interaction of the motor rotor and the bar magnets 78 and 79 associated with the magnetic reed switches must be kept to a minimum.

Other changes in the form and details may be made to the motor of the present invention without departing from the spirit and scope thereof.

Various modes of carrying out the invention are contemplated as being within the scope of the following claims particularly pointing out and distinctly claiming the subject matter which is regarded as the invention.

I claim:

1. An electric motor suitable for connection between the positive and negative terminals of a direct current source comprising:

a rotatable output shaft;

a rotor mounted on said output shaft having a pair of magnetically opposite poles rotatable, with said shaft, in a circular path;

a plurality of energizable windings of current carrying conductors selectively connectable to the direct current source and positioned with respect to said rotor to provide a rotation-producing torque on said rotor when energized; and commutation means interposed between said windings and the direct current source for sequentially connecting said windings to the direct current source responsive to the rotation of said rotor, said commutation means being spacedly located along the circular path of said rotor and comprising a plurality of switch groups equal in number to the number of motor windings, each of said switch groups comprising a pair of single pole, double throw, magnetic reed switches having bias means urging said switches into a normally closed first position and having an open second position, one switch of each pair being interposed between one of said motor windings and the positive terminal of the direct current source for energizing the former from the latter when in the first position, the other switch of each pair being interposed between the one of said windings and the negative terminal of the direct current source for energizing the former from the latter when in the first position, the switches of each pair having oppositely poled magnetic bias means associated therewith for overcoming the first position bias means of said switches to place said switches in the second position and for allowing opposite polarity magnetic poles of said rotor to return the switches to the normally closed first position when in proximity to said switches, thereby selectively energizing said windings from said direct current source.

2. The electric motor according to claim 1 wherein the poles of said rotor are movable in a plane perpendicular to the axis of rotation of the output shaft, wherein said windings are bobbin wound and arranged on the plane of rotation of the rotor poles so that the poles are periodically inserted in the windings as said rotor rotates, said switch groups being mounted on said windings for being operated by said rotor when the rotor poles are periodically inserted in the windings.

3. An electric motor according to claim 1 including a semi-conductor current control means having power circuits interposed between the direct current source and the windings and control circuits connected to said switch groups for operating said power circuits for sequentially connecting said windings to the direct current source.

4. An electric motor according to claim 3 including a semi-conductor current control means, said semi-conductor current control means comprising pairs of complementary transistors, said transistors having power circuits connected between said windings and the direct current source, each of said pairs of transistors having control circuits connected in parallel to a switch group for complementary operation of the transistor pair when the magnetic reed switches are in the first position.

5. An electric motor according to claim 1 including an auxiliary magnetic member mounted on the output shaft and rotatable therewith in synchronism with said rotor, said auxiliary magnetic member having a pair of magnetically opposite poles rotatable with said shaft in a circular path; said switch groups being spacedly located along the circular path of the auxiliary magnetic member for sequentially connecting selected windings to the direct current source for energization as the motor shaft rotates.

* * * * *

UNITED STATES PATENT OFFICE
CERTIFICATE OF CORRECTION

Patent No. 3,678,359                    Dated    July 18, 1972

Inventor(s)    DONOVAN F. PETERSON

It is certified that error appears in the above-identified patent and that said Letters Patent are hereby corrected as shown below:

Col. 5, lines 50-60     Rewrite the table as follows:

| Rotor Position (defined by pole insertion in specified winding) | Condition of Stator Winding (switches in closed position) | | |
|---|---|---|---|
| | Winding 22 | Winding 24 | Winding 26 |
| N pole - winding 26 | 606 | 601 | deen. |
| S pole - winding 22 | deen. | 601 | 602 |
| N pole - winding 24 | 603 | deen. | 602 |
| S pole - winding 26 | 603 | 604 | deen. |
| N pole - winding 22 | deen. | 604 | 605 |
| S pole - winding 24 | 606 | deen. | 605 |

Signed and sealed this 23rd day of January 1973.

(SEAL)
Attest:

EDWARD M. FLETCHER, JR.　　　　　　　　ROBERT GOTTSCHALK
Attesting Officer　　　　　　　　　　　Commissioner of Patents